(12) United States Patent
Reynolds et al.

(10) Patent No.: US 8,535,044 B2
(45) Date of Patent: Sep. 17, 2013

(54) APPARATUS AND METHOD FOR RELEASING A LENS MOLDED IN A CAVITY BETWEEN POSTERIOR AND ANTERIOR MOLD SECTIONS

(75) Inventors: Ger M. Reynolds, Waterford (IE); Jerry E. Sullivan, Waterford (IE); John J. Cardiff, Waterford (IE); Alan D. Kelly, Kilkenny (IE); Frank J. Rouse, Waterford (IE)

(73) Assignee: Bausch & Lomb Incorporated, Rochester, NY (US)

( * ) Notice: Subject to any disclaimer, the term of this patent is extended or adjusted under 35 U.S.C. 154(b) by 15 days.

(21) Appl. No.: 13/331,766

(22) Filed: Dec. 20, 2011

(65) Prior Publication Data

US 2012/0164261 A1     Jun. 28, 2012

Related U.S. Application Data

(62) Division of application No. 12/515,440, filed as application No. PCT/EP2007/061240 on Oct. 19, 2007, now Pat. No. 8,105,070.

(30) Foreign Application Priority Data

Dec. 21, 2006    (IE) ..................................... 2006/0936

(51) Int. Cl.
*B29C 43/50*     (2006.01)
(52) U.S. Cl.
USPC ........... 425/440; 425/176; 425/422; 425/472; 425/808; 264/334; 264/336
(58) Field of Classification Search
None
See application file for complete search history.

(56) References Cited

U.S. PATENT DOCUMENTS

| 4,190,621 | A | 2/1980 | Greshes .......................... 264/1.8 |
| 4,254,065 | A | 3/1981 | Ratkowski ..................... 425/808 |
| 4,474,355 | A | 10/1984 | Greshes |
| 5,466,147 | A | 11/1995 | Appleton et al. |
| 5,693,268 | A | 12/1997 | Widman et al. |
| 5,850,107 | A | 12/1998 | Kindt-Larsen et al. |

(Continued)

FOREIGN PATENT DOCUMENTS

| GB | 0796825 | 6/1958 |
| WO | WO 2004/030898 A1 | 4/2004 |
| WO | WO2005/011966 | 2/2005 |

OTHER PUBLICATIONS

International Search Report from OIFIG NA bPAITINNI Patents Office dated Jul. 28, 2008.

(Continued)

*Primary Examiner* — Timothy Kennedy
(74) *Attorney, Agent, or Firm* — Glenn D. Smith

(57) ABSTRACT

An apparatus and method for releasing a lens molded in a cavity between posterior and anterior mold sections and adhered thereto. A post is configured to support a flange of the posterior section while the anterior section remains spaced from the post. Posterior section is compressed between a pin applied to an outer concave surface of the posterior section and the post, thereby initially releasing peripheral regions of the posterior section and subsequently the remaining portions thereof. Upon separation, the anterior section together with the lens drops onto the post so that its outer convex surface rests on the post. A collar unit with gas channels presses against a flange of the anterior section while blowing jets of gas towards an interface between a "monomer" ring formed around the lens. In this manner, initially the "monomer" ring and then peripheral regions of the lens are separated from the anterior section.

18 Claims, 10 Drawing Sheets

(56) References Cited

U.S. PATENT DOCUMENTS

| | | |
|---|---|---|
| 5,975,875 A | 11/1999 | Crowe, Jr. et al. |
| 6,368,096 B1 | 4/2002 | Dobner et al. |
| 6,428,723 B1 | 8/2002 | Lesczynski et al. |
| 6,558,584 B1 | 5/2003 | O'Neill et al. |
| 6,638,362 B2 | 10/2003 | Dobner et al. |
| 2003/0160343 A1 | 8/2003 | Hodgkinson |
| 2004/0061246 A1 | 4/2004 | Cardiff et al. ............ 264/1.1 |
| 2006/0071356 A1 | 4/2006 | Beebe |
| 2007/0138670 A1 | 6/2007 | Beebe et al. |

OTHER PUBLICATIONS

International Search Report from OIFIG NA bPAITINNI Patents Office dated Mar. 28, 2008.

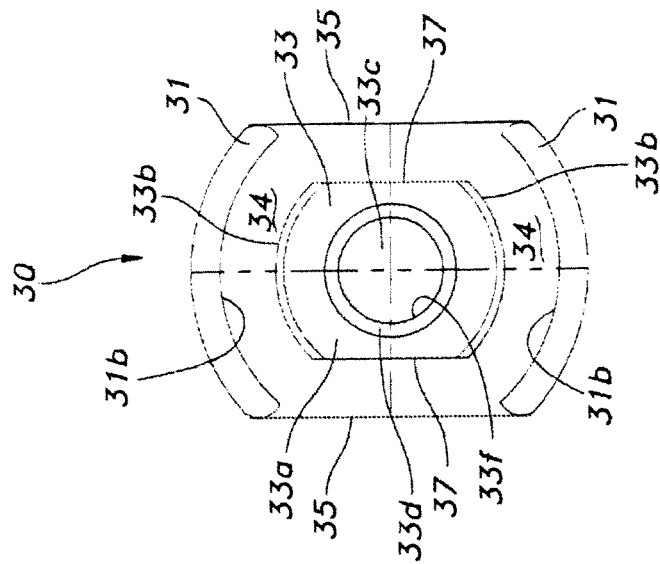
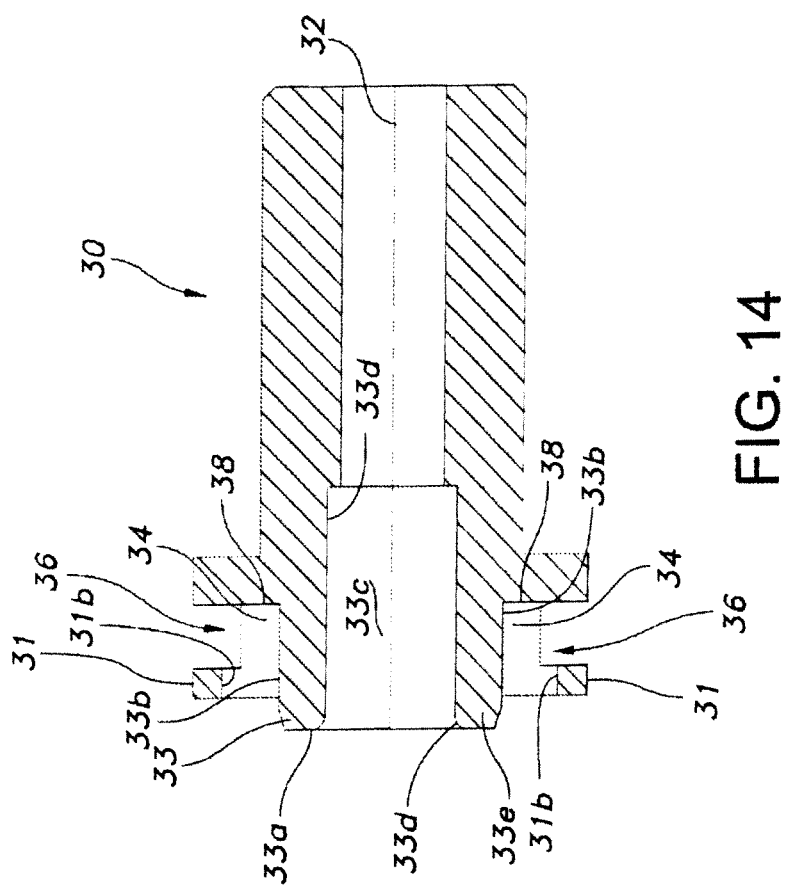
FIG. 15
FIG. 14

APPARATUS AND METHOD FOR RELEASING A LENS MOLDED IN A CAVITY BETWEEN POSTERIOR AND ANTERIOR MOLD SECTIONS

This application is a divisional of application Ser. No. 12/515,440, filed May 19, 2009, which is a U.S. National Stage under 35 USC 371 of PCT/EP2007/061240, filed Oct. 19, 2007, which claims the benefit of Ireland Application No. 2006/0936, filed Dec. 21, 2006.

This present invention relates to an apparatus and a method for releasing a moulded lens from a cast mould.

Static cast moulding of contact lenses is known. For example, U.S. Pat. No. 5,466,147 issued to Bausch & Lomb Incorporated describes a single mould unit for making a single lens comprising an anterior mould section having a concave optical surface and posterior mould section having a convex optical surface. The anterior and posterior mould sections are complementarily shaped and are brought together to form a lens-moulding cavity between the facing anterior and posterior optical surfaces of the anterior and posterior mould sections, respectively.

The basic process for cast moulding a lens is as follows. A quantity of liquid lens material 16 is dispensed onto the concave optical surface 12A of the anterior mould section 12 (FIG. 1), and the posterior mould section 14 is seated upon the anterior mould section 12 with the concave and convex surfaces 14A and 12A thereof, respectively, facing one another to form a lens-shaped mould cavity. The joined anterior and posterior mould sections form a single mould which is subjected to a curing cycle (e.g., by thermal or UV radiation) thereby causing polymerization of the lens material in the mould cavity (FIG. 2). Subsequently, a number of steps must be carried out in order to retrieve the cured lens from the mould cavity.

Separation of Mould Parts

Once the lens material has cured, the posterior and anterior mould sections must be separated to retrieve the cured lens. This procedure is sometimes referred to as "decapping" in the art. The opening or release of the mould sections must be carried out in a manner which will not harm the delicate lens. Once the lens has polymerized in the mould cavity, the lens and any excess lens material will adhere to the opposing concave and convex mould surfaces. Thus, the force required to release the posterior mould section from the anterior mould section must be strong enough to break the adhesive bond of the lens and excess lens material to the opposing mould surfaces, yet not so forceful or haphazard that the optical surfaces of the lens are harmed by the release process. Should the lens crack or otherwise be damaged during the mould release process, the lens must be rejected thereby lowering the output yield and increasing manufacturing costs. Typically, after the decapping step, the cured lens is retained in the anterior mould section whilst the posterior section is removed. For example, U.S. Pat. No. 5,850,107 (Kindt-Larsen et al.) describes an apparatus for separating the anterior and the posterior mould parts, wherein each of the mould parts has an annular circumferential flange respectively surrounding the mould cavity. The apparatus includes a first device for applying steam to the concave non-optical surface of the posterior mould part to provide a temperature gradient from the posterior mould part to the anterior mould part and a second device comprising pry fingers for inserting between the circumferential flanges and pulling the mould parts apart. The provision of the temperature gradient is undesirable for the cured lens since the lens can deform and not re-gain its required curvature upon cooling. If the separation is attempted without providing the temperature gradient, there is a risk that the lens will be damaged. Furthermore, there is no guarantee that the cured lens will remain adhered to the desired mould part upon the separation step. Another arrangement separating the mould parts apart is disclosed in U.S. Pat. No. 5,693,268 (Widman et al.) in which the mould parts are pulled apart by inserting wedges therebetween.

A further arrangement is described in U.S. Pat. No. 6,428,723 (Lesczynski et al.) in which the posterior mould section has a downwardly facing skirt which rests on an annular end surface of a movably mounted hollow cylinder which surrounds the anterior mould section. The inner diameter of the cylinder substantially corresponds to the outer diameter of a downwardly facing skirt of the anterior mould section. A pin exerts a force on the posterior section from above as the hollow cylinder moves in the direction of the pin in order to pull the mould parts apart. Because of the mutual disposition of the mould parts, the pulling force acts on the entire area of the lens and there still remains the risk of damaging the lens. In another embodiment disclosed in this reference, instead of the annular end surface, the hollow cylinder has a pointed edge formed by tapered inner and outer surfaces of the cylinder. The edge is inserted between the inner and outer surfaces of the skirts of the posterior and anterior mould sections respectively, thereby radially deflecting the skirt of the posterior mould section and causing the posterior mould section to disengage from the lens. In this arrangement, the deflection amplitude of the skirt of the posterior mould section is limited, which in turn limits the control over the posterior mould during the decapping operation.

U.S. Application Publication No. 2003/0160343 describes a separation module in which the mould parts are oriented so that the anterior mould section 12 (FIG. 3) is upper-most in relation to the posterior, convex mould part 14. An annular flange 14c of the posterior mould part 14 rests on a support plate 260 and a means is provided for striking the anterior mould part 12 from above at an annular flange 12c so as to break the adhesion bond between the mould parts 12,14. In accordance with another known method, the posterior mould part 14 is located upper-most in relation to the anterior mould part 12 and the anterior mould part is supported from below on posts. A means is provided for striking from above the annular surface surrounding the lens forming surface of the posterior mould part 14 so as to break the bond between the mould parts. There still remains a risk associated with the latter two methods in that the lens may be damaged due to the dynamic force applied to the relevant mould part.

Removal of Excess Moulding Material ("Monomer Ring" Removal)

To ensure that the mould cavity is completely filled with the liquid lens material during the moulding process described above, the quantity of liquid lens material dispensed in the anterior mould section is purposely greater than that needed to form the lens (FIG. 4). When the posterior mould section 14 is seated upon the anterior mould section 12, the excess liquid lens material 180 is expelled from the mould cavity (FIG. 5). This excess liquid is typically held in a "reservoir", a groove or a flange surrounding the mould cavity, and is cured along with the lens. The cured excess material 180 is typically referred to as a "monomer ring" or a "HEMA ring" in the contact lens art, depending on the specific lens material used. The term "monomer ring" will be used herein for convenience, although it is understood this term is used broadly herein to cover any type of lens material employed. During mould separation, the monomer ring will usually adhere to one of the mould sections, typically the anterior section 12, with the monomer ring usually retained in the anterior mould section 12 along with the lens (FIGS. 6 and 7). Should the lens be released and removed from the anterior mould surface without prior removal of the monomer ring from the reservoir, the lens edge will likely become damaged due to interference with the monomer ring (FIG. 8). The presence of the monomer ring can also interfere with downstream processes and machinery. It is thus desirable to release and remove the monomer ring from the anterior mould section prior to the release and removal of the lens therefrom. Various monomer ring removal processes have been employed in the prior art, none of which has proven entirely satisfactory. For example, U.S. Pat. No. 6,368,096 and U.S. Pat. No. 6,638,362 (Dobner et al.) describe, respectively, an apparatus and a method for removing the monomer ring from a reservoir surface of the anterior mould. The disclosure describes piercing the monomer ring with annularly spaced pins or blades 52 and rotating them around the reservoir surface whereby the monomer ring is sheared from the anterior mould section 12 to which it was adhered white the moulded lens remains intact in the mould cavity (FIG. 9). While this apparatus is quite useful, difficulties may be encountered when the ring has a relatively low volume, or when the ring material is very brittle. For example, the pins or blades that pierce the monomer ring may break the ring into several smaller pieces. These smaller pieces are more difficult to remove, and some pieces may remain on the contact lens.

Another method is disclosed in U.S. Pat. No. 5,975,875 (Crowe, Jr. et al.), in accordance with which variously shaped notches or steps are formed on the surface of the posterior mould part which surrounds the mould cavity. The notches project into the monomer ring when the monomer ring is in a liquid state. When the monomer ring has cured it adheres to the notches or the steps such that when the posterior mould part is separated from the anterior mould part, the monomer ring is removed with the posterior part. With this arrangement, there still remains a risk that parts of the ring will remain adhered to the anterior mould part after the separation of the posterior mould part from the anterior mould part.

U.S. Patent Application Publication 2006/0071356-A1 (Beebe) describes a tooling for removing excess monomer material from the anterior mould part. The tooling comprises a plate in a surface of which there is formed a wedge-shaped groove which has a first pair of opposed tapered surfaces that guide the anterior mould part as it is moved through the groove. The wedge-shaped groove also has a second pair of opposed tapered surfaces that contact and deflect the monomer ring material as the anterior mould part is guided by the first pair of tapered surfaces, thereby displacing and removing the excess material from the anterior mould part while the cured lens remains adhered to the anterior mould part. As with the '875 device, there still remains a problem that pieces of the monomer ring may remain adhered to the anterior mould part and that some pieces may become loose and interfere with the cured lens or with the tooling.

Release of Cured Lens from a Surface of a Mould Section

Once the mould sections have been separated, the lens will adhere to a surface of one of the mould sections and must therefore be released from the mould section on which it is retained. As mentioned above, the lens typically remains adhered to the anterior mould section. Both wet and dry release methods of lens release have been proposed in the prior art. In wet lens release methods, an aqueous solution is used to wet the hydrophilic lens which absorbs water and swells, causing the lens to separate from the mould surface. In dry release methods, the lens is removed from the associated mould surface while still in the dry state. In general, dry releasing a lens from the associated mould part is preferred over wet release methods. This is because the lens is much easier to handle when in the dry state as opposed to the wet state. In the dry state, it is easy to pick the lens with a vacuum picking head and move the lens from one process station to another. The adhesive bond between the lens and mould surface is broken, usually by deformation of the mould so as to move the mould surface relative to the lens. For example, WO 2004/030898 (Bausch & Lomb Inc.) discloses a method and an apparatus for dry releasing of the anterior, convex surface of a lens from an anterior mould part 12 (FIG. 10) which involves applying a first force to peripheral regions of the convex non-optical surface 12D of the anterior mould part, and subsequently applying a second force against an apex region 12E of the non-optical convex surface. WO 2005/061212 (Bausch & Lomb Inc.) teaches a method and an apparatus for dry-releasing a cured lens from the anterior mould part 12 (see FIG. 11) comprising a servo-driven lens release head 19 positionable in register with the anterior mould part 12 and having a downwardly facing annulus 19a. A pin 280 is placed beneath an apex portion of the non-optical convex surface 12e of the anterior mould part. When the release head 19 is lowered over the anterior mould part 12, the annulus 19a presses against an upwardly facing annular surface 12f surrounding the moulding cavity of the anterior mould part thereby causing the free end of the pin 280 to engage with the non-optical convex surface 12a and deforming the anterior mould part 12 and breaking the bond between the mould part and the lens, starting from the centre of the lens and continuing tin the outward direction. A similar tool is described in U.S. Pat. No. 6,558,584 (O'Neill et al.) where instead of the annulus 19a of the '212 reference, a specifically configured top plate 580 (FIG. 12) is provided. During the release process, the pin 280 located underneath the anterior mould part 12 moves towards the mould part 12 and displaces it so that the upwardly facing annular surface 12f of the anterior mould part presses against a downwardly facing flat surface 581 of the top plate 58.

Once the adhesive bond has been broken, the lens is retrieved, for example by a vacuum picking tool.

When releasing a lens from its associated mould in the dry state, the lens will necessarily absorb some of the force used against the mould to release the lens therefrom. Thus, as with the previous step of releasing the posterior mould section from the anterior mould section, the force used to release the lens from the mould must be of a force strong enough to break the adhesive bond between the lens and the opposing mould surface, yet not so forceful or haphazard that the optical surfaces of the lens are harmed by the release process. As with the previous step of decapping, should the lens crack or be otherwise damaged during the lens release process, the lens must be rejected, thereby lowering the output yield and increasing manufacturing costs. While the above dry release methods are satisfactory in certain mould part/lens combinations of materials and designs, they have proven unsatisfactory in instances where, for example, the mould part is formed of a relatively rigid material which makes it harder to deform the mould part relative to the lens to which it is adhered without harming the lens in the process. This situation is particularly acute when the lens is a toric lens which includes indicia in the lens surface which tend to adhere to the mould part more strongly than the surrounding smooth surface of the lens. Releasing a lens of this type in the dry state can cause cracking particularly adjacent the toric markings of the lens. Furthermore, the above methods are associated with the risk of damaging the edge of the lens.

Consequently, there remains a need in the art for an improved method of releasing a lens from its associated mould part while in the dry state.

The object of the present invention is to obviate and/or mitigate the above discussed problems of the prior art.

Accordingly, the invention provides a device for supporting a mould comprised of an anterior mould section, a posterior mould section and a contact lens formed in a mould cavity defined between the mould sections, the device comprising:

a support post having a longitudinal axis;

a first support element positioned on the post radially outwardly spaced from the longitudinal axis, the first support element comprising a first face for supporting the posterior mould section and a radially inwardly directed face;

a second support element positioned on the post spaced from the first support element, the second support element comprising a second face for supporting the anterior mould section and a radially outwardly directed face;

wherein the first and second support elements are configured with respect to the mould so that when the posterior mould section rests on the first face, the anterior mould section is longitudinally spaced apart from the second support element.

In order to maintain the longitudinal spacing, the first and second support elements are ideally immovable with respect to each other.

It will be appreciated that in the present application, expressions "longitudinal(ly)", "longitudinally directed", "in the longitudinal direction" etc., "diametrically", "radially" etc. are used with respect to the longitudinal axis.

In one embodiment, the longitudinal spacing between the posterior mould section and the second support element is achieved by sufficiently spacing apart the first and the second faces along the longitudinal axis so that when the posterior mould section rests on the first face, the second face is spaced apart form the anterior mould section.

Preferably, a gap is defined between the radially inwardly directed face of the first support element and the radially outwardly directed face of the second support element, the gap being configured to receive a skirt portion depending from the anterior mould section.

In a preferred arrangement, the gap is configured so as to accommodate a flange projecting from the skirt portion of the anterior mould section, thereby further providing for improved flexibility of the mould.

Ideally, the first end face is adapted to support at least a peripheral portion of a flange projecting from a skirt portion of the posterior mould section.

Such an arrangement provides for greater flexibility of the mould compared to the prior art devices. The flexibility of the mould is required during the operation of decapping, which will be discussed below n greater detail, i.e. separation of the anterior mould section from the posterior mould section.

Ideally, the second support element is configured with respect to the skirt portion of the anterior mould section so as to be received within the skirt portion. More specifically, the second support element is preferably configured with respect to the skirt portion of the anterior mould section so that when the second support element is received within the skirt, a sufficient spacing is provided between inner surfaces of the skirt and outer surfaces of the second support element to provide a clearance for deformation of the skirt in the radial direction.

In a most preferred arrangement, the second face is configured to abut an outer convex surface of the anterior mould section. This abutment occurs after the posterior and the anterior mould sections have been separated from each other and, since the anterior mould section is not supported by anything, apart from being adhered to the posterior mould section, the anterior mould section drops onto the second face. The anterior mould section drops under the influence of gravity which may be assisted by vacuum. Preferably, the second face is in a form of an annular surface surrounding an aperture formed in the second support element such that when the outer convex surface of the posterior mould section abuts the annular surface, a portion of the outer convex surface projects into the aperture the aperture being sized and shaped so that the outer convex surface remains spaced apart from surfaces defining the aperture. In one aspect, the annular surface serves to support the anterior mould section during the operations of removing the monomer ring (i.e. the excess material expelled from the moulding cavity into a reservoir between mutually facing surfaces of the mould sections surrounding the cured lens) and releasing the lens from the anterior mould section. These operations will be discussed below in greater detail. In another aspect, the annular surface serves as a bearing surface for bending of the anterior mould section during those operations when a longitudinally directed force is applied to the flange of the skirt of the anterior mould section. In one embodiment, the aperture of the second support element may be in a form of a bore.

In a preferred embodiment, the first support element comprises a pair of diametrically opposing shoulders, preferably arcuate, but not limited thereto. The shoulders ideally project proud from an end surface of the post in the longitudinal direction. Such an arrangement has the advantage that the flange of the skirt of the posterior mould section is supported by the shoulders only at diametrically opposing regions of the flange and not along its entire circumference thereby providing for the necessary freedom to flex for the posterior mould section during the decapping operation.

Conveniently, each shoulder comprises a slot formed in the radially inwardly facing face of the shoulder, the slot being configured to receive at least a peripheral portion of the flange of the anterior mould section upon radial outward deflection (discussed below) of adjacent portions of the skirt of the anterior mould section during the operations of removing the monomer ring and releasing the lens from the anterior mould section. The slot may be either through or blind as long as it is configured to accommodate the deflected flange.

In a preferred embodiment, the second support element and the gap between the radially inwardly directed face of the first support element and the radially outwardly directed face of the second support element are configured with respect to the anterior mould section so that when the anterior mould section rests on the second face, the flange of the skirt of the anterior mould section is suspended within the gap, i.e. does not come into contact with any of the surrounding surfaces. This provides the flange with the necessary freedom to flex during the application thereto of the longitudinal force.

In a preferred arrangement, the second support element comprises a pillar located substantially centrally between the shoulders. The pillar ideally projects proud from the end surface of the post in the longitudinal direction, i.e. in the same direction as the shoulders. In one arrangement, the second face may comprise a chamfer formed between an end surface of the pillar and an inner surface defining the aperture. Of course, other configurations of the second face are envisaged within the scope of the invention, such as for example an annular rounded edge. The pillar preferably comprises a pair of diametrically opposing flats on an outer surface of the pillar so as to provide a clearance for radial inward deformation of the skirt of the anterior mould section when the anterior mould section rests on the second face. The radial inward deformation occurs during the operations of removing the monomer ring and releasing the lens from the anterior mould section when a longitudinal force is applied to a pair of diametrically opposed portions of the flange of the anterior mould section causing adjacent skirt portions to deflect towards the longitudinal axis. The radial inward deformation of these portions at the skirt causes two other diametrically opposed portions thereof perpendicular to the first two portions to deflect radially outwardly, as discussed above.

The post ideally comprises a pair of diametrically opposing flats on an outer surface of the post to prevent rotation of the post in a pallet. Other known means for preventing rotation of the post are also envisaged.

The present invention further provides a pressing means for applying a longitudinally directed force to a central area of an outer concave surface of the posterior mould section when the posterior mould section and, in particular, the flange thereof rests on the first face, the longitudinally directed force being sufficient to compress and deform the posterior mould section between the means and the first face thereby breaking an adhesive bond between the lens and the posterior mould section, starting around peripheral regions of the lens and continuing towards the centre of the lens. In this manner, the posterior section is "peeled" away from the lens so that the mould sections separate from each other. The posterior mould section can then be taken away, whilst the lens and the surrounding monomer ring remain adhered to the anterior mould section. It has been found that in this arrangement, only a fraction of the force is required to separate the mould sections compared to the known prior art methods.

In one embodiment, the pressing means may comprise a pin. The pin has a free end which is preferably of a rounded shape. In use, the free end of the pin applies pressure to the outer concave surface of the posterior mould section during the decapping operation. The pin may be movable and the support post may remain stationary. However, it is within the scope of the present invention to arrange the pin to remain stationary and the post to be movable. Indeed, both the pin and the post may be movably mounted.

Yet further, the present invention provides a first means for supplying at least one jet of gas directed at an interface between a rim of excess expelled lens material (i.e. the monomer ring) formed around peripheral regions of the lens and adhered to a surface of the anterior mould section surrounding the lens, the force of the jet being sufficient to break the adhesive bond between the excess lens material and the surface and thereby to separate the excess lens material from the anterior mould section.

The means for supplying the at least one jet of gas may comprise a first element positionable about the excess lens material, the first element comprising a channel for supplying the gas and forming the at least one jet. In a preferred arrangement, the first element comprises a substantially tubular wall having an inner surface, and the gas supply channel comprises an aperture formed in the inner surface of the tubular wall, the aperture being located so that when the first element is brought into a pre-determined position about the excess material, the aperture is positioned substantially opposite the interface. Ideally, the first element comprises a plurality of apertures spaced around the perimeter of the inner surface of the tubular wall. In one specific arrangement, the inner surface is cylindrical and the first element comprises eight apertures spaced at 45° from each other.

In addition, the means for supplying the at least on jet of gas may comprise a vacuum means longitudinally spaced apart from the gas channel, the vacuum means being operable to draw the gas away from the mould section. The vacuum force may be selected sufficient to take the removed monomer ring away from the posterior mould section.

Still further, the present invention provides a second means for applying a longitudinally directed force to the flange of the skirt of the anterior mould section, when the anterior mould section rests on the second face. In one application, this force is sufficient to cause a surface of the anterior mould section surrounding the lens to which surface excess lens material formed around peripheral regions of the lens is adhered to deflect in the direction of the force thereby at least partially breaking the adhesive bond between a rim of excess expelled lens material and the surface. In another application, the force is sufficient to cause a concave surface of the anterior mould section to which the cured lens is adhered to deflect in the direction of the force thereby breaking the adhesive bond between the lens and the concave surface of the posterior mould section at least around peripheral regions of the lens starting from an outer edge of the lens and continuing in the direction of the centre of the lens. In this manner, peripheral regions of the lens are firstly separated or "peeled" from the anterior mould section before the lens is subjected to an operation of releasing the entire lens from the anterior mould section. This ensures that the edge of the lens remains intact during the operation of releasing the entire lens. Upon separating the peripheral regions of the lens, the anterior mould section together with the lens, may be transferred to another location for releasing the entire lens. The second means for applying the longitudinally directed force to the flange of the anterior mould section ideally comprise a pair of diametrically spaced apart projections, each projection comprising an end face adapted for abutting and pressing against the flange. In such an arrangement, the force is applied only to a pair of diametrically opposing regions of the flange, thereby providing the flange and the skirt with the necessary freedom to flex radially inwardly under the pressure applied by the projections. At the same time, another pair of diametrically opposing regions perpendicular to the first two regions deflect radially outwardly.

In one arrangement, the first and second means are preferably connected to each other so that when the first means is brought into the pre-determined position about the excess material in order to apply the at least one jet of gas, the second means applies the longitudinally directed force to the flange of the anterior mould section.

In a further aspect, the invention provides a method of separating the posterior mould section from the anterior mould section and from the cured lens formed in the mould cavity defined between the mould sections, wherein the lens is adhered to corresponding moulding surfaces of the mould sections, the method comprising the steps of:

locating at least a peripheral portion of the flange of the posterior mould section on the first face of the first support element; and applying a substantially longitudinally directed force to the central area of the outer concave surface of the posterior mould section, the force being sufficient to compress and deform the posterior mould section between the area of application of the force and the first face thereby breaking an adhesive bond between the lens and the posterior mould section, starting around peripheral regions of the lens and continuing towards the centre of the lens, whereby the posterior mould section separates or "peels" away from the anterior mould section and the lens remains adhered the inner concave surface of the anterior mould section.

Applying the longitudinally directed force to the central area of the outer concave surface of the posterior mould section preferably includes pressing the above described pin against the central area.

The application of the force also causes the excess cured lens material (the monomer ring) formed around peripheral regions of the lens and adhered to surfaces of the mould sections surrounding the lens to separate from the posterior mould section and remain adhered to the anterior mould section.

In a preferred arrangement, when the flange of the posterior mould section is located on the first support element, the flange of the anterior mould section is received in the gap defined between the radially inwardly facing face of the first support element and the radially outwardly facing face of a second support element. The first and second elements are configured with respect to the anterior mould section so that the latter is longitudinally spaced apart from the second support element. The anterior mould section does not come into contact with any of the surrounding surfaces and is held only by the adhesive bond between the anterior mould section and the lens, which lens in turn is adhered to the posterior mould section. Consequently, upon separation of the posterior mould section from the anterior mould section and from the lens, the anterior mould section drops onto the second face of the second support element whereby the second face comes into abutment with the outer convex surface of the anterior mould section, as described above.

In yet a further aspect, the invention provides a method of removing excess expelled cured lens material adhered to a surface of the anterior mould section surrounding the lens, the excess material being formed around peripheral regions of the cured lens, the cured lens being adhered to the concave moulding surface of the mould section, the method comprising the steps of:

locating the anterior mould section on the second support element; and directing at least one jet of gas at the interface between the excess lens material and the surface of the mould section to which the excess material is adhered, the force of the at least one jet being sufficient to break the adhesive bond between the mould section and the excess lens material and to separate the excess lens material from the mould section.

Ideally, a first element is positioned about the excess lens material, the first element comprising a channel for supplying and forming the at least one jet of gas, so that the channel is positioned substantially opposite the interface.

In a preferred arrangement, the method comprises directing a plurality of jets of gas supplied from a plurality of channels spaced apart from each other on the first element so as to at least partially, and preferably wholly, encompass the excess material.

Ideally, the jets of gas are supplied from the eight apertures spaced at 45° from each other along the perimeter of the inner surface of the tubular wall of the first element.

The gas is preferably drawn away from the mould section (using e.g. vacuum) thereby carrying the separated excess material away from the mould section.

Ideally, the method comprises locating the outer convex surface of the anterior mould section on the annular surface of the second support element.

In order to assist the jet(s) of gas in removing excess material, a longitudinally directed force is preferably applied to the flange of the anterior mould section, the force being sufficient to cause the surface of the anterior mould section to which the excess expelled cured lens material is adhered to deflect in the direction of application of the force thereby at least partially breaking the adhesive bond between peripheral regions of the excess expelled cured lens material and the posterior mould section and thereby assisting the gas jets in entering the interface. Ideally, the longitudinal force is applied by the pair of diametrically opposed projections.

In a preferred arrangement, upon removing the excess material from the anterior mould section, the longitudinally directed force continues to apply to the flange. This force is sufficient to cause the inner concave surface of the anterior mould to deflect in the direction of the application of the force thereby breaking the adhesive bond between the lens and the surface, at least around peripheral regions of the lens, starting from an outer edge of the lens and continuing in the direction of the centre of the lens.

DESCRIPTION OF SPECIFIC EMBODIMENTS

The invention will hereinafter be more particularly described with reference to the accompanying drawings which show, by way of example only, an embodiment of the present invention.

In the drawings:—

Figure 1:
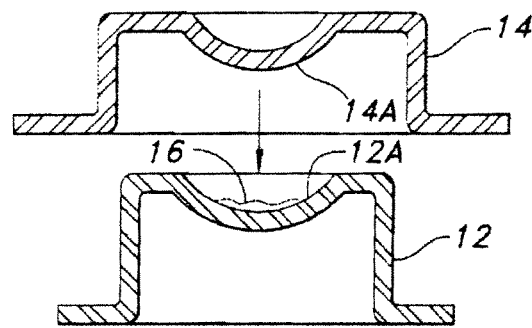
FIGS. 1 and 2 show cross-sectional views of a prior art mould for cast moulding a lens.
Figure 2:
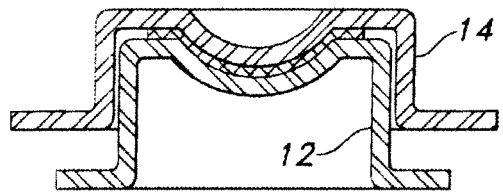
Figure 3:
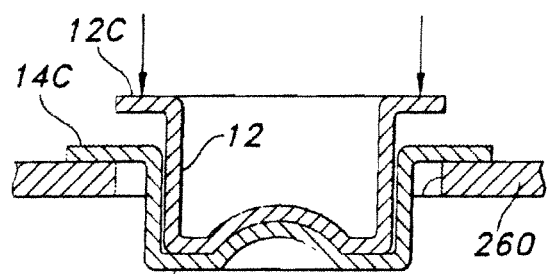
FIG. 3 illustrates a prior art method of separating the mould parts of a cast mould from each other so that the cured lens remains adhered to one of the mould parts.
Figure 4:
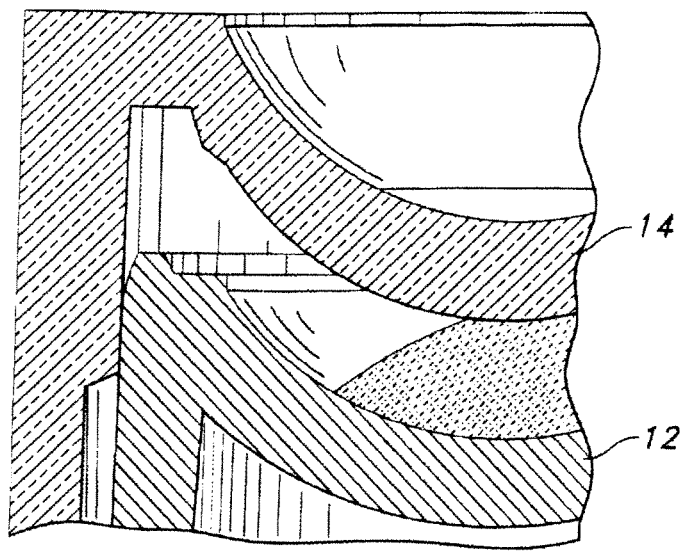
FIGS. 4 and 5 are cross-sectional views of a prior art mould for cast moulding a lens illustrating the process of moulding a lens and the formation of a "monomer ring" around the lens.
Figure 5:
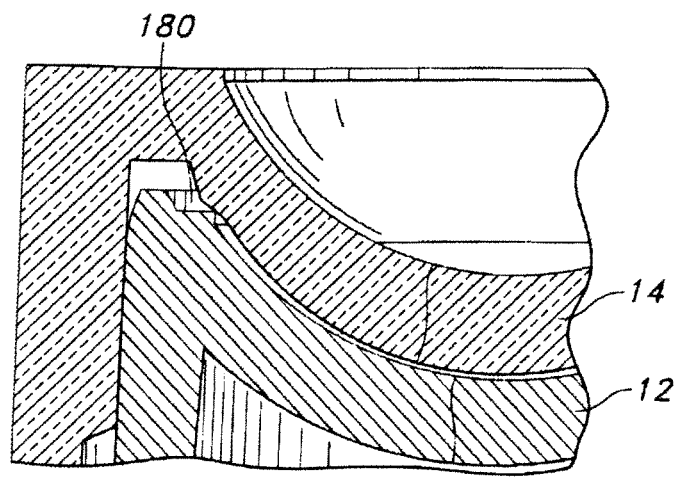
Figure 6:
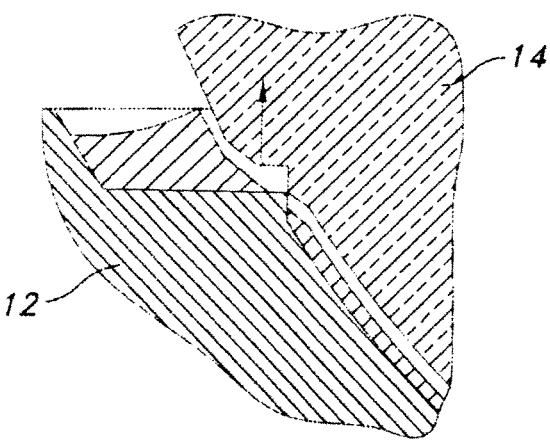
FIGS. 6 to 8 are enlarged views of the mould of FIGS. 4 and 5 showing the steps of lens cure, mould separation and lens and monomer ring release, respectively.
Figure 7:
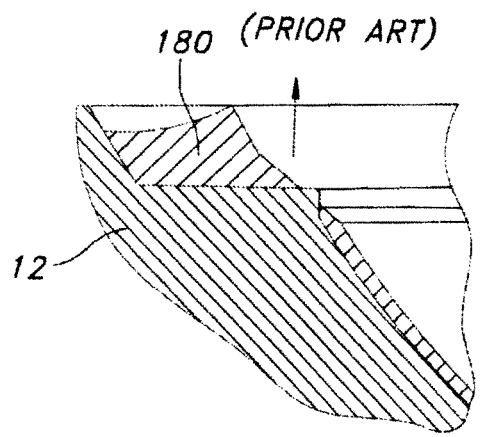
Figure 8:
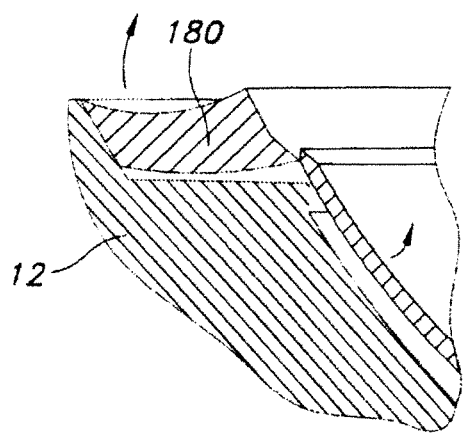
Figure 9:
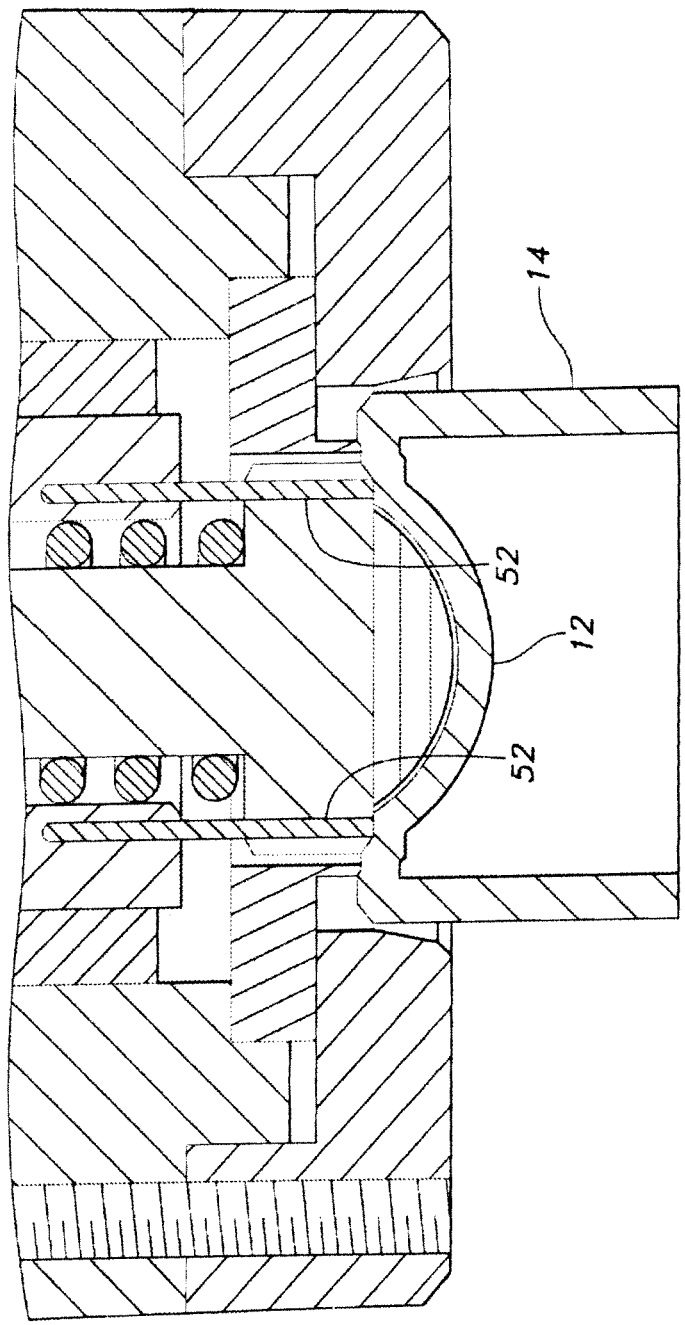
FIG. 9 is a cross-sectional view of a prior art mould with a cured lens therein showing a prior art arrangement for removing the "monomer ring"
Figure 10:
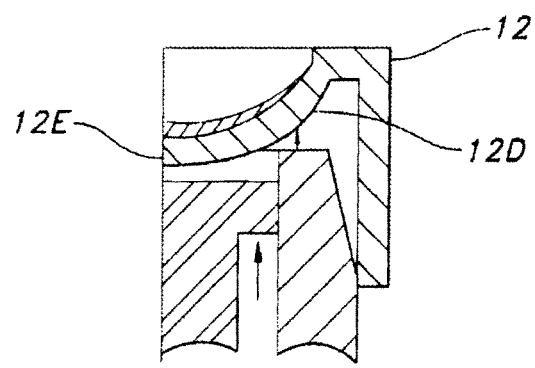
Figure 11:
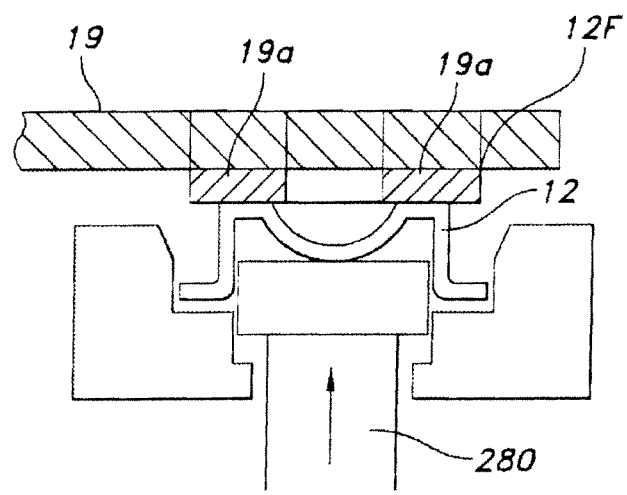
Figure 12:
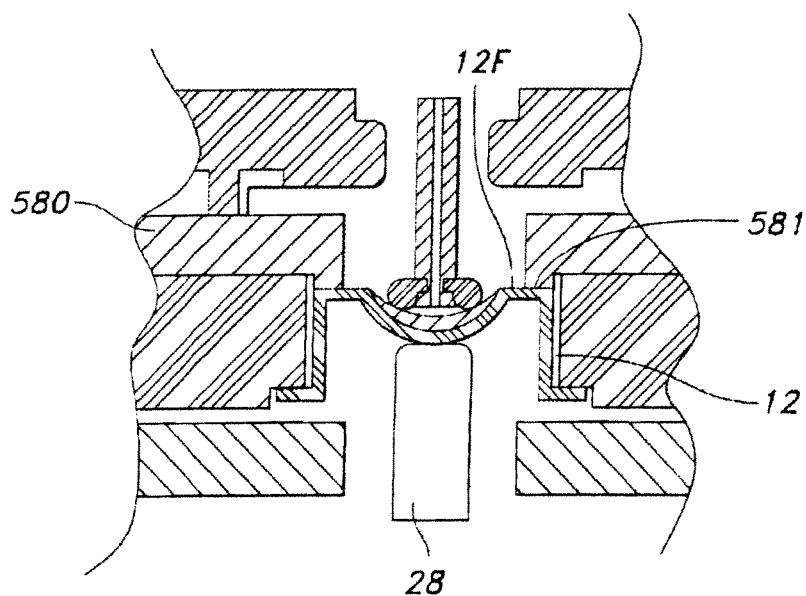

FIGS. 10 to 12 each shows a cross-sectional view of a prior art device for dry-releasing a cured lens from a surface of a mould section.

Figure 13:
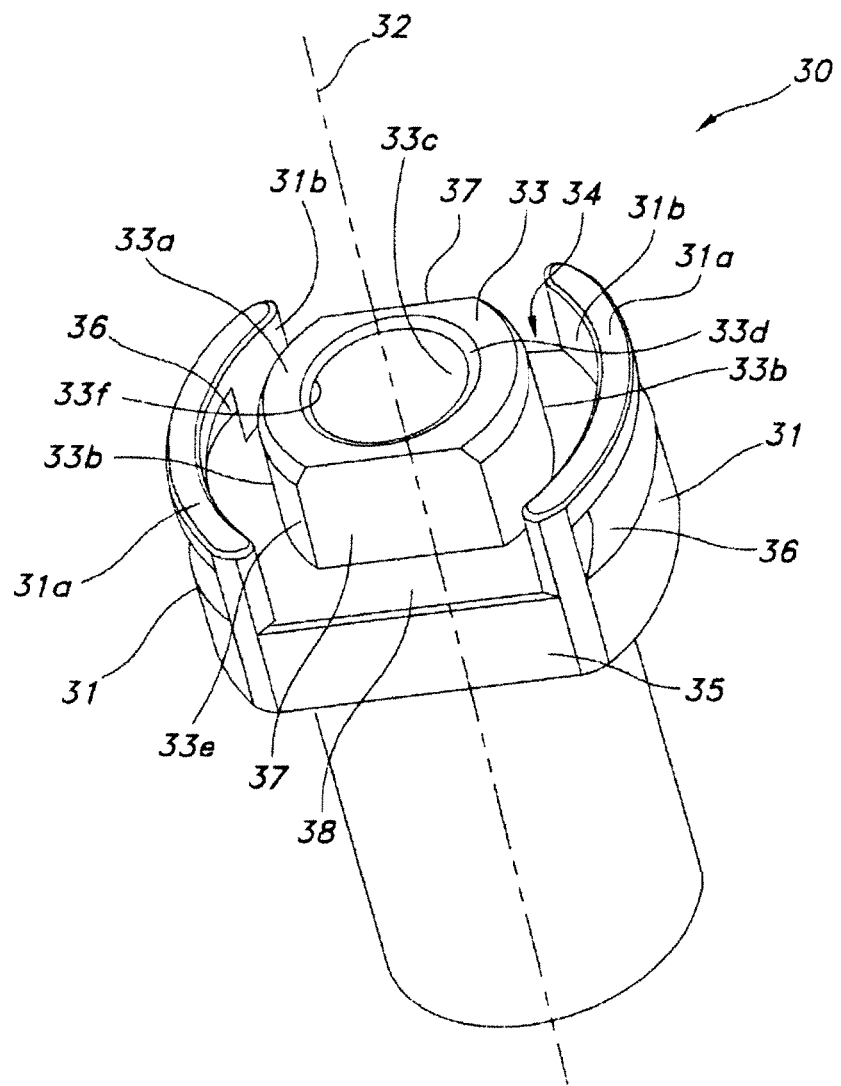

FIG. 13 is a perspective view of a device according to the invention for supporting a mould with a lens.

Figure 16:
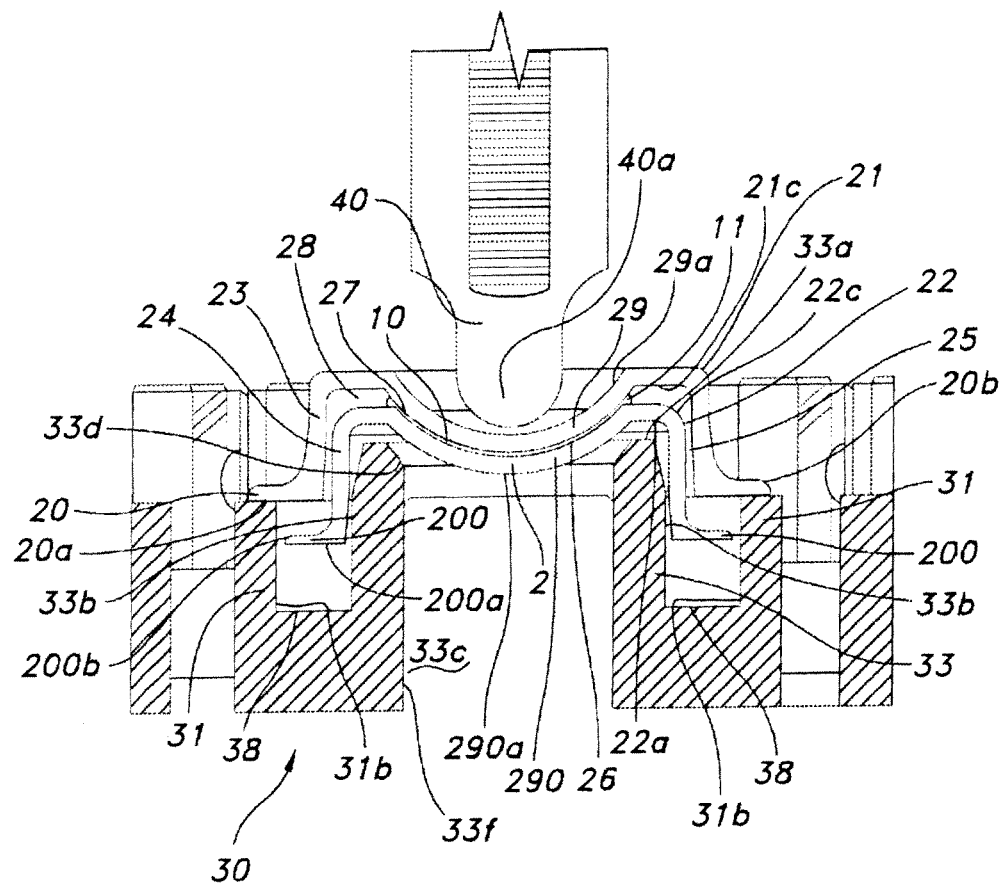
Figure 17:
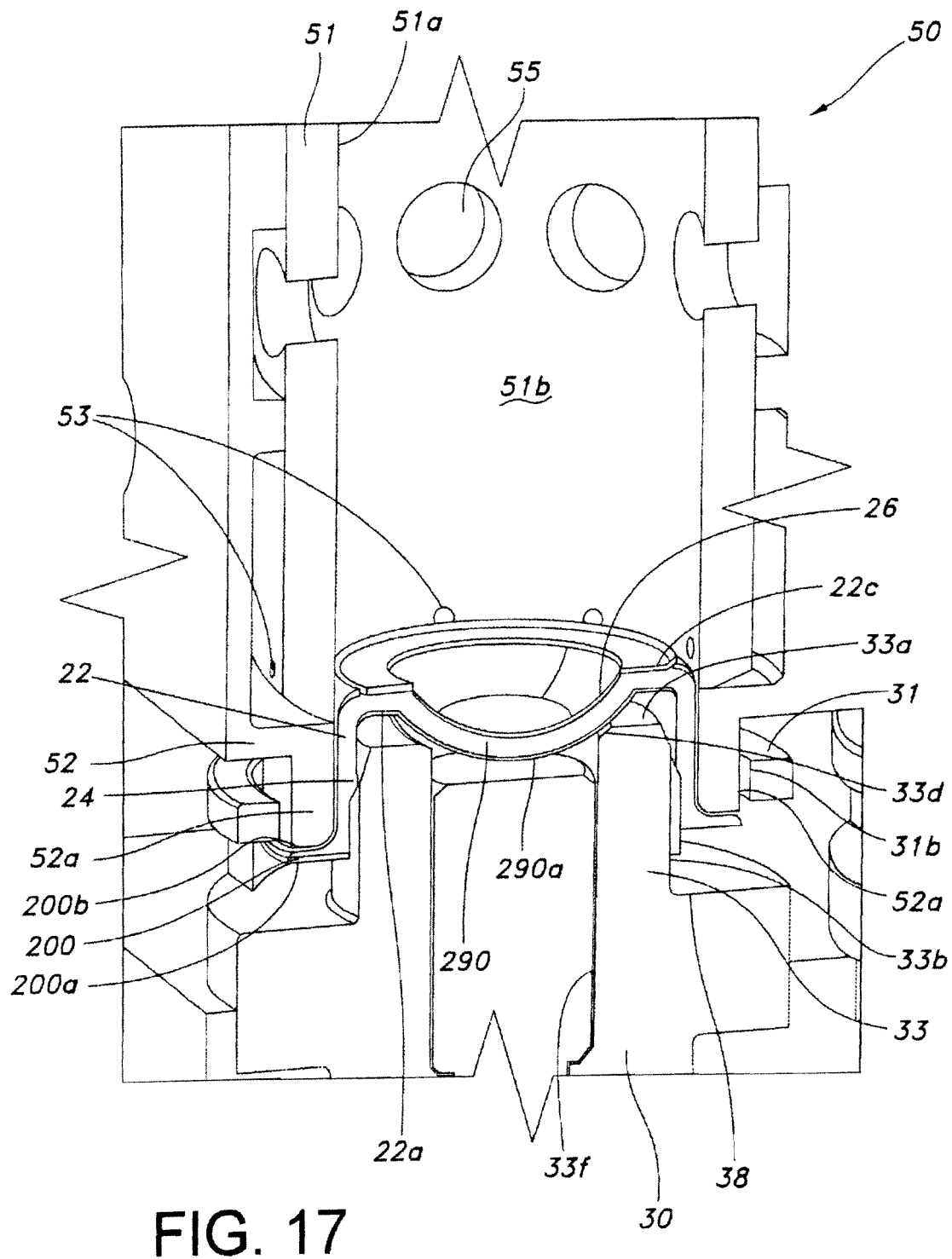
Figure 18:
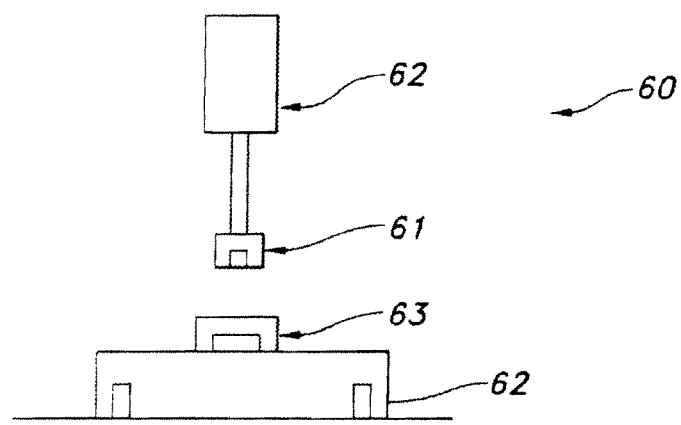

FIGS. 14 and 15 are a side cross-sectional view and a top view, respectively of the post of FIG. 13;

FIG. 16 is a side elevation of an assembly in accordance with the invention for separating an anterior mould section from a posterior mould section;

FIG. 17 is a side elevation of an assembly in accordance with the invention for removing excess material and releasing edges of the cured lens from the posterior mould section; and FIG. 18 is a schematic illustration of a force measurement system for use with the present invention.

The invention is illustrated in FIGS. 13 to 17. With reference initially to FIGS. 13 to 16, an assembly for separating a posterior mould section from an anterior mould section will be described.

FIG. 16 shows a typical mould 2 for cast moulding an ophthalmic lens. The mould 2 comprises a posterior mould section 21 for forming the posterior, i.e. the concave lens surface and an anterior mould section 22 for forming the anterior, i.e. the convex lens surface. The mould sections 21 and 22 include respective tubular skirts 23 and 24. The inner diameter of the skirt 23 is larger than the outer diameter of the skirt 24 so that the skirt 24 can be received in the skirt 23. Each skirt 23 and 24 has a radially projecting flange 20 and 200, respectively. Each flange 20, 200 has and end face 20a and 200a, respectively and a back face 20b, 200b, respectively. A gap 25 is defined between the inner and outer surfaces of the skirts 23 and 24, respectively, to provide a clearance to enable the outer skirt 23 to flex as will be described below.

In FIG. 16, the mould 2 is shown with a lens 10 having already been formed (in accordance with a typical moulding process described above) and cured between an inner convex surface 27 of the posterior mould section 21 and an inner concave surface 26 of the anterior mould section 22. A gap 28 is defined between annular surfaces 21c and 22c of the posterior and anterior mould sections, respectively, surrounding their respective surfaces 27 and 26. The gap 28 serves as a reservoir for receiving excess lens material expelled from the mould cavity during the formation of the lens 10. The excess material 11 is typically referred to in the art as "monomer ring". After the lens 10 has been cured, the mould sections 21, 22 need to be separated from each other. This operation is typically referred to in the art as "decapping".

Separation of Mould Parts

FIG. 16 illustrates an assembly according to the invention for decapping the mould 2. The assembly comprises a support post 30 on which the mould 2 is located. The post 30 is preferably, but without any limitation to the scope of the invention, adapted to be placed on a pallet (not shown) for carrying a plurality of such supporting posts. With reference to FIGS. 13 to 15, the support post 30 comprises a longitudinal axis 32 and a first supporting element in the form of a pair of opposing shoulders 31 radially outwardly spaced from the longitudinal axis 32. Herein, expressions "longitudinal(ly)", "longitudinally directed", "in the longitudinal direction" etc., "diametrically", "radially" etc. should be understood to be used in relation to the longitudinal axis 32. Each shoulder 31 projects proud from a base face 38 of the post 30 and has a first end face 31a and an inwardly radially facing face 31b. The post 30 also comprises a second supporting element in the form of a pillar 33 located substantially centrally between the shoulders 31 and projecting proud from the base face 38 of the post 30. The pillar 33 has a second end face 33a and a radially outwardly facing face 33b. In the present embodiment, the shoulders 31 and the pillar 33 are parts of the same element. It is within the scope of the invention that separate posts may be provided, one for supporting the posterior mould section 21 and the other for supporting the anterior mould section 22. Also, the supporting post 30 and shoulders 31 are immovable with respect to one another. Nevertheless, other arrangements are envisaged within the scope of the invention in which the shoulders 31 can be movably arranged with respect to the pillar 33. As seen from FIG. 13, the shoulders 31 in the presently described embodiment are arcuate and the pillar 33 is in the form of a substantially cylindrical tube. The invention, however, is not limited to these particular configurations. A gap 34 is defined by the inwardly facing face 31b of each shoulder 31, the outwardly facing face 33b of the pillar 33 and the base face 38 of the post. When the mould 2 is mounted on the post 30, peripheral portions of the flange 20 of the posterior mould section 21 rest on the first end faces 31a. At the same time, a portion of the skirt 24, together with the flange 200 of the anterior mould section 22 are received in the gap 34. The dimensions of the shoulders 31, the pillar 33 and the gap 34 are selected with respect to the mould 2 such that when the flange 20 rests on the first end faces 31a, an outer face 22a of the anterior mould section surrounding the curved (i.e. the mould cavity forming) portion 290 of the anterior mould section and the second end face 33a are spaced apart. In fact, the anterior mould section 22 does not come into contact with any of the surrounding surfaces, except the anterior lens surface to which it is adhered. This spacing provides the outer skirt 23 with freedom to flex during the decapping operation. In the present embodiment, the pillar 33 comprises a tubular wall 33e which has an inner surface 33f which defines an inner bore 33c. The inner bore 33c is sized and shaped so as to at least partially accommodate the curved portion 290 of the anterior mould section 22. It will be appreciated that instead of the bore 33c e.g. a suitably shaped blind recess may be provided. If the post 30 is to be used in a pallet for handling a plurality of such posts, a pair of diametrically opposing flats 35 may be provided on the outer surface of the post 30 to prevent rotation of the post in the pallet. Various other means usual in the art may alternatively be provided for securing the post 30 in the pallet.

Referring to FIG. 16, the decapping assembly further comprises a pin 40 positionable against an outer concave surface 29a of the curved (i.e. the mould cavity forming) portion 29 of the posterior mould section 21. The pin 40 has a rounded free end 40a to enable a surface contact between the free end 40a and a central region of the outer concave surface 29a. It will be appreciated that the scope of the invention is not limited to such a particular rounded configuration of the pin end 40a. In the present embodiment, the pin 40 is movable and the post 30 remains stationary. However, it is possible to arrange the assembly so that the post 30 is movable and the pin 40 remains stationary, or so that both the pin 40 and the post 30 can be moved relative to each other.

In use, during the decapping operation, the free end 40a of the pin 40 applies a longitudinally directed force to the central portion of the outer concave surface 29a. The first end faces 31a of the shoulders 31 apply a counteractive force against the end face 20a of the flange 20 of the posterior mould section 21. Consequently, the mould 2 is compressed between the free end 40a of the pin 40 and the first end faces 31a of the shoulders 31. The compression force deforms the curved part 29 of the posterior mould section and breaks the adhesive bond between the lens-forming convex surface 27 of the posterior mould section 21 and the concave posterior surface of the lens 10. The adhesive bond starts to break initially at the periphery of the lens 10 and continues to break towards the centre of the lens. The posterior mould section 21 thereby "peels" away or separates from the lens and from the anterior mould section 22 so that the lens 10 remains adhered to the lens-forming concave surface 26 of the anterior mould section 22. The monomer ring 11 remains adhered to an annular surface 22c of the anterior mould section 22 surrounding the lens-forming concave surface 26. The separated posterior mould section 21 can then be taken away by suitable instrument such as a vacuum picker or a gripping tool.

Once the mould sections 21 and 22 have been separated, the anterior mould section 22 (since it is only held by the adhesive bond with the lens 10) falls under the influence of gravity onto the pillar 33 so that a region of an outer convex surface 290a of the curved portion 290 abuts an annular surface or a chamfer 33d formed between the second end face 33a of the pillar 33 and the inner surface 33f thereby positioning the posterior mould section 22 for the subsequent operations of removing the monomer ring 11 and releasing the lens 10 from the posterior mould section 22. Only an annular region of the outer convex surface 290a abuts the chamfer 33d. The remaining portion of the convex surface 290a surrounded by the chamfer 33d projects into the bore 33c. It will be appreciated that instead of the chamfer 33d, a square, rounded or otherwise suitably shaped edge (not shown) may be provided. The outer diameter of the pillar 33 is sufficiently smaller than the inner diameter of the skirt 24 firstly, to enable a substantially snug-free advancement of the anterior mould section 22 towards the pillar 33 and secondly, to allow the anterior mould section 22 to flex during the operations of removing the monomer ring 11 and releasing the lens 10 from the anterior mould section 22, which will be described below.

It is believed that the above described configuration of the post with respect to the mould 2 helps to reduce the force required to separate the mould sections 21, 22 so as to provide for more gentle separation and to reduce the risk of so called "edge defects", i.e. damage to the peripheral portions of the lens 10.

Removing the Monomer Ring and Releasing an Outer Edge of the Lens

With reference to FIGS. 13 to 15 and 17, an assembly for removing the monomer ring 11 and releasing peripheral regions about the outer edge of the lens 10 from the anterior mould section 22 will now be described.

As shown in FIG. 17, the monomer ring removing and lens edge releasing assembly comprises the above-described supporting post 30. The pillar 33 and the shoulders 31 are sized and configured with respect to the anterior mould section 22 so that when the convex surface 290a of the anterior mould section 22 rests on the chamfer 33d, the end face 200a of the flange 200 is spaced sufficiently apart from the surrounding surfaces, in particular the base face 38, so as to enable the flange 200 to flex upon application thereto of a longitudinally directed force as will be described below. Also, whilst the convex surface 290a abuts the chamfer 33d, the outer face 22a and the second end face 33a remain spaced apart. This latter arrangement allows the anterior mould section 22 to flex about the annular region of contact between the chamfer 33d and the convex surface 290a.

The assembly further comprises a collar unit 50 which in use is positioned adjacent the anterior mould section 22. The collar unit 50 comprises a substantially tubular wall 51 an inner surface 51a of which defines an inner bore 51b. When the collar unit 50 is positioned adjacent the anterior mould section 22, the wall 51 encompasses the lens-forming concave surface 26 of the posterior mould section 22 together with the lens 10 and with the monomer ring 11 around the lens 10. A number of gas supply apertures 53 are formed in an inner surface 51c of the wall 51. The gas supply apertures 53 are located on the inner surface 51a so that when the collar unit 50 is brought into a predetermined position adjacent the anterior mould section 22, the apertures 53 are positioned substantially opposite the interface 100 and preferably substantially level with the outer annular surface 22c. Each aperture 53 is configured to shape gas passing therethrough into a jet and to direct the jet at an interface 100 between the outer annular surface 22c and the monomer ring 11. The apertures may, however, be also located above or/and below the level of the annular surface 22c as long as the jets of gas are directed at the interface 100. The arrangement is configured such that the force applied by the jets of gas is sufficient to break the bond between the monomer ring 11 and the annular surface 22c and to lift and remove the monomer ring 11 from the annular surface 22c. In the present embodiment, eight apertures 53 circumferentially spaced from each other by 45° have been found sufficient. It will be appreciated that the invention is not limited to the plurality of the gas supply apertures 53. Instead, for example, a single circumferentially extending slot (not shown) can be formed in the inner surface 51a. An example of gas to be used for the monomer ring removal is air, but it will be appreciated that that other inert gas of gaseous mixture can be utilised.

In the present embodiment, the collar unit 50 has an end member 52 for applying a longitudinally directed force to the back surface 200b of the flange 200. In the present embodiment, the collar unit 50, as will be described below, is used for both removing the monomer ring 11 and for releasing peripheral regions about the edge of the lens 10 from the posterior mould section 22, but it will be appreciated that the collar unit 50 and the end member 52 may be provided as separate attachments for these two operations. The end member 52 comprises a pair of diametrically opposing projections 52a. At the same time when the collar unit is brought into the predetermined position adjacent the anterior mould section for the application of the gas jets, the projections 52a press against the back surface 200b of the flange 200. Under the force of the projections 52a, the portions of the flange 200 (together with the adjacent skirt 24 portions) which are in contact with the projections 52a deform and deflect substantially radially inwardly. The chamfer 33d of the pillar 33 applies a counteractive force against the outer convex surface 290a of the anterior mould section 22 causing the concave portion 290 and the outer surface 22c to bend about the region of contact between the convex surface 290a and the chamfer 33d. This deformation causes the outer annular surface 22c to deflect in the direction of application of the force by the projections 52a thereby breaking the adhesive bond between the monomer ring 11 and the outer annular surface 22c. Peripheral regions of the monomer ring 11 thus peel off and stand proud on the annular surface 22c so that a space (not shown) is created therebetween. When the gas jets are activated, they enter the space created between the monomer ring 11 and the annular surface 22c and separate the remaining portions of monomer ring 11 from the annular surface 22c.

The above described radial inward deflection of the flange 200 and the skirt 24 causes the other portions of the flange 200 (and the adjacent skirt 24 portions) which are not in contact with the projections 52a to deflect substantially radially outwardly. If the opposing projections 52a are so located with respect to the post 30 that they contact those portions of the flange 200 which are disposed outside the gap 34, those portions of the flange 200 which are disposed inside the gap 34 will deflect radially outwardly and would interfere with the shoulders 31. For this reason, each shoulder 31 has a slot 36 which can either be through as shown in FIG. 14 or blind (not shown). The slot is sized and shaped for accommodating the radially outwardly deflecting flange 200 and a portion of the skirt 24. Also, in order to provide more room for the deformation of the flange 200 and the skirt 24, a pair of diametrically opposing flats 37 may be provided on the outer surface of the pillar 33.

Once the monomer ring 11 has been separated from the posterior mould section 21, it is taken away from the mould by suitable means such as, for example, vacuum or gripping means. For example only, as shown in FIG. 17, vacuum apertures 55 may be provided in the inner surface 51a of the wall 51 longitudinally spaced apart from the anterior mould section 22. The size of the vacuum apertures 55 is sufficient to allow the separated monomer ring 11 to pass therethrough away from the anterior mould section 22 area.

Next, the peripheral regions about the edge of the lens 10 have to be released from the anterior mould section 22. For this purpose, the projections 52a continue to apply the force against the back surface 200b of the flange 200 in the same manner as described above in connection with the removal of the monomer ring 11 thereby breaking the adhesive bond between the lens and the concave surface 26 starting between the outer edge of the lens 10 and the lens-forming concave surface 26 and continuing towards the centre of the lens 10, thereby releasing peripheral regions from the anterior mould section. Upon separation of the peripheral regions of the lens, the anterior mould section together with the pre-separated lens is ready to be subjected to a known operation of separation of the entire lens from the anterior mould section. In this manner, the risk of damage to the lens edge during the release of the lens is greatly reduced compared to known methods.

Once released, depending on the design of the manufacturing process, the lens 10 may be removed by a suitable tool, such as for example, a vacuum picker. Alternatively, the lens 10 may remain in the mould cavity and be transferred together with the post 30 to downstream locations. It is believed that the above described assembly and method of removing the monomer ring 11 and releasing the lens 10 significantly help to reduce the risk of damaging the outer edges of the lens 10. Such damage to the outer edge of the lens is a serious defect which leads to the lens having to be rejected by quality control and discarded.

In the above described assembly for removing the monomer ring and releasing the lens edge, the collar unit 50 is movable and the post 30 remains stationary. However, it is possible to arrange the assembly so that the post 30 is movable and the collar unit 50 remains stationary, or so that both the collar unit 50 and the post 30 can be moved to and from each other. Also, in the present embodiment, the above described assembly is suitable for both removing the monomer ring 11 and releasing the lens edge. Although such a combined assembly is highly advantageous and convenient, since it provides for the reduction of manufacturing time, it will be appreciated that the invention is not limited to the combined assembly. For example, instead, two separate assemblies can be provided, one assembly for removing the monomer ring 11 and the other assembly for releasing the lens edge. Accordingly, the first assembly may comprise the post 30 and the above described collar unit 50 together with the end member 52. The second assembly may comprise the post 30 and just the end member 52 for the operation of releasing the lens edge.

For a successful decapping operation, an optimal force should to be selected to be applied by the pin 40 to the outer concave surface 29a of the posterior mould section 21. Similarly, an optimal force should be selected to be applied by the opposing projections 52a to the flange 200 of the anterior mould section 22 in order to remove the monomer ring 11 and release the lens edge. Incorrectly selected forces may cause damage to the lens. For the purpose of determining optimal forces to be applied by the pin 40 and by the projections 52a, a force measurement system 60 schematically shown in FIG. 18 has been designed. The system 60 comprises an interchangeable head 61 connected to either a mechanically driven load cell 62 or a servo (not shown). The interchangeable head 16 can be used with the pin 40 to measure an optimal force for decapping, and with the projections 52a to measure the optimal force for removing the monomer ring 11 and releasing the lens edge. The system also comprises a means for supporting the mould sections 21, 22 during the measurements which may take the form of a pallet 62. The pallet 62 is supplied with interchangeable fixtures 63 (one fixture only is shown in FIG. 18) for placement of mould sections 21, 22 for the respective operations decapping and removing monomer ring 11/releasing the lens edge. The interchangeable fixture 63 is positioned underneath the interchangeable head 31 so that, when received in the interchangeable fixture, the centre of the relevant mould section 21 or 22 is aligned with the interchangeable head. By operating the interchangeable head 61 with different force settings, optimum force is established for the operations of decapping and removing monomer ring 11/releasing the lens edge.

It will of course be understood that the invention is not limited to the specific details described herein, which are given by way of example only, and that various modifications and alterations are possible within the scope of the invention.

The invention claimed is:

1. A device for separating a posterior mold section from an anterior mold section wherein a cured lens is adhered to corresponding molding surfaces of the mold sections, the device comprising:
   a support post having a longitudinal axis;
   a first support element positioned on the post radially outwardly spaced from the longitudinal axis, the first support element comprising a first face adapted to provide support for at least a peripheral portion of a flange projecting from a skirt portion of the posterior mold section;
   a pressing means for applying a longitudinally directed force to a central area of an outer concave surface of the posterior mold section, when the flange of posterior mold section rests on the first face;
   the longitudinally directed force being sufficient to compress and deform the posterior mold section between the pressing means and the first face thereby breaking an adhesive bond between the lens and the posterior mold section, starting around peripheral regions of the lens and continuing towards the center of the lens, thereby separating the posterior mold section from the anterior mold section, wherein the pressing means comprises a pin having a free end, wherein the pin is movable and the support post remains stationary, wherein the first support element comprises a radially inwardly directed face and wherein the device further comprises:
   a second support element positioned substantially centrally on the post, the second support element comprising a second face for supporting the anterior mold section, and a radially outwardly directed face;
   a as defined between the radially inwardly facing face of the first support element and the radially outwardly directed face of the second support element, the gap being configured to receive a skirt portion depending from the anterior mold section; and
   wherein the first and second support elements are configured with respect to the mold so that when the posterior mold section rests on the first face, the anterior mold section is longitudinally spaced apart from the second support element, wherein the first and second faces are spaced from each other along the longitudinal axis so that when the posterior mold section rests on the first face, the second face is spaced apart to the anterior mold section, wherein the first and second support elements are immovable with respect to each other.

2. A device as claimed in claim 1, wherein the gap is configured so as to accommodate a flange projecting from the skirt portion of the anterior mold section.

3. A device as claimed in claim 2, wherein the second support element is configured with respect to the skirt portion of the anterior mold section so as to be received within the skirt portion.

4. A device as claimed in claim 3, wherein the second support element is configured with respect to the skirt portion of the anterior mold section so that when the second support element is received within the skirt, sufficient spacing is provided between inner surfaces of the skirt and outer surfaces of the second support element to provide clearance for deformation of the skirt in the radial direction.

5. A device as claimed in claim 4, wherein the second face is configured to abut an outer convex surface of the anterior mold section.

6. A device as claimed in claim 5, wherein the second face is in a form of an annular surface surrounding an aperture formed in the second support element such that when the outer convex surface of the anterior mold section abuts the annular surface, a portion of the outer convex surface projects into the aperture, the aperture being sized and shaped so that the outer convex surface remains spaced apart from surfaces defining the aperture.

7. A device as claimed in claim 6, wherein the aperture of the second support element is in a form of a bore.

8. A device as claimed in claim 7, wherein the first support element comprises a pair of diametrically opposing shoulders.

9. A device as claimed in claim 8, wherein the shoulders are arcuate.

10. A device as claimed in claim 9, wherein each shoulder comprises a slot formed in the radially inwardly directed face, the slot being configured to receive at least a peripheral portion of the flange of the anterior mold section when the anterior mold section rests on the second face upon radial outward deflection of adjacent portions of the skirt of the anterior mold section.

11. A device as claimed in claim 10, wherein the second support element comprises of a pillar located substantially centrally between the shoulders.

12. A device as claimed in claim 11, wherein the second face comprises a chamfer formed between an end surface of the pillar and an inner surface defining the aperture.

13. A device as claimed in claim 12, wherein the pillar comprises a pair of diametrically opposing flats on an outer surface of the pillar so as to provide a clearance for radial inward deformation of the skirt of the anterior mold section when the anterior mold section rests on the second face.

14. A device as claimed in claim 13, wherein the second support element and the gap between the radially inwardly directed face of the first support element and the radially outwardly directed face of the second support element are configured with respect to the anterior mold section so that when the anterior mold section rests on the second face, the flange of the skirt of the anterior mold section is suspended within the gap.

15. A device as claimed in claim 14, comprising a means for supplying at least one jet of gas directed at an interface between a rim of excess expelled lens material formed around peripheral regions of the lens and adhered to a surface of the anterior mold section surrounding the lens, the force of the jet being sufficient to break the adhesive bond between the excess lens material and the surface and thereby separate this excess material from the mold section.

16. A device as claimed in claim 15, comprising a pressing means for applying a longitudinally directed force to a radially extending flange of the skirt of the anterior mold section, when the anterior mold section rests on the second face.

17. A device as claimed in claim 16, adapted to apply a force sufficient to cause a surface of the anterior mold section surrounding the lens to deflect in the direction of the force thereby at least partially breaking an adhesive bond between the excess lens material and the surface.

18. A device as claimed in claim 17, wherein the force is sufficient to cause a concave surface of the anterior mold section to which the cured lens is adhered to deflect in the direction of the force thereby breaking the adhesive bond between the lens and the concave surface at least about peripheral regions of the lens, starting from an outer edge of the lens and continuing in the direction of the center of the lens.

* * * * *